United States Patent
Komori et al.

(10) Patent No.: US 10,634,208 B2
(45) Date of Patent: Apr. 28, 2020

(54) BEARING MEMBER, AND VIBRATION DAMPING DEVICE USING SAME

(71) Applicants: HONDA MOTOR CO., LTD., Minato-Ku, Tokyo (JP); DAIDO METAL COMPANY LTD., Nagoya-shi, Aichi (JP)

(72) Inventors: Kentaro Komori, Wako (JP); Daijiro Endo, Wako (JP); Masato Kushiya, Inuyama (JP); Mikio Suzuki, Inuyama (JP)

(73) Assignees: Honda Motors Co., Ltd., Tokyo (JP); Daido Metal Company Ltd., Aichi (JP)

( * ) Notice: Subject to any disclaimer, the term of this patent is extended or adjusted under 35 U.S.C. 154(b) by 0 days.

(21) Appl. No.: 15/759,671

(22) PCT Filed: Sep. 15, 2016

(86) PCT No.: PCT/JP2016/077333
§ 371 (c)(1),
(2) Date: Mar. 13, 2018

(87) PCT Pub. No.: WO2017/047718
PCT Pub. Date: Mar. 23, 2017

(65) Prior Publication Data
US 2019/0040924 A1    Feb. 7, 2019

(30) Foreign Application Priority Data

Sep. 15, 2015   (JP) .................. 2015-181583

(51) Int. Cl.
*F16F 9/53*   (2006.01)
*F16F 9/36*   (2006.01)
(Continued)

(52) U.S. Cl.
CPC .............. *F16F 9/366* (2013.01); *F16C 17/02* (2013.01); *F16C 17/12* (2013.01); *F16C 33/109* (2013.01);
(Continued)

(58) Field of Classification Search
CPC ....................................................... F16F 9/535
(Continued)

(56) References Cited

U.S. PATENT DOCUMENTS 4,439,484 A   3/1984   Mori
5,284,330 A   2/1994   Carlson et al.
(Continued)

FOREIGN PATENT DOCUMENTS

CN   101102891 A   1/2008
CN   102162499 A   8/2011
(Continued)

OTHER PUBLICATIONS

Office Action dated Oct. 8, 2018 in the corresponding German patent application 11 2016 004 176.4 with English translation thereof.
(Continued)

*Primary Examiner* — Thomas W Irvin
(74) *Attorney, Agent, or Firm* — Carrier Blackman & Associates, P.C.; Joseph P. Carrier; William D. Blackman

(57) ABSTRACT

An object of the present invention is to provide a vibration damping device including a bearing member capable of achieving simplification of configuration in the vibration damping device, reducing frictional force during operation, and having an excellent wear resistance. A vibration damping device of the present invention includes a bearing structure, in which a metal bush (bearing member) has a resin layer on a side defined as a friction sliding surface of a base member, the resin layer includes polytetrafluoroeth-
(Continued)

ylene and a tetrafluoroethylene-perfluoroalkyl vinyl ether copolymer resin, and the metal bush is lubricated by a magneto-rheological fluid composition.

3 Claims, 11 Drawing Sheets

(51) Int. Cl.
    *F16C 33/20* (2006.01)
    *F16C 33/10* (2006.01)
    *F16C 17/02* (2006.01)
    *F16C 17/12* (2006.01)
    *F16F 9/06* (2006.01)

(52) U.S. Cl.
    CPC .......... *F16C 33/1025* (2013.01); *F16C 33/20* (2013.01); *F16C 33/201* (2013.01); *F16C 33/203* (2013.01); *F16F 9/363* (2013.01); *F16F 9/535* (2013.01); F16C 2208/22 (2013.01); F16C 2208/32 (2013.01); F16C 2208/80 (2013.01); F16C 2326/05 (2013.01); F16C 2361/53 (2013.01); F16F 9/067 (2013.01); F16F 2222/06 (2013.01); F16F 2224/02 (2013.01); F16F 2224/045 (2013.01); F16F 2228/066 (2013.01); F16F 2230/0052 (2013.01); F16F 2230/04 (2013.01)

(58) Field of Classification Search
    USPC .............................................. 188/267, 267.2
    See application file for complete search history.

(56) References Cited

U.S. PATENT DOCUMENTS

| | | | | |
|---|---|---|---|---|
| 5,604,285 A | * | 2/1997 | Miyamori | ................ C08K 3/08 524/413 |
| 6,516,926 B2 | * | 2/2003 | Lisenker | ............... B24B 21/004 188/267.1 |
| 6,607,820 B2 | * | 8/2003 | Niwa | ...................... C08L 27/18 428/323 |
| 7,785,013 B2 | * | 8/2010 | Egami | ................... F16C 33/201 384/283 |
| 9,458,885 B2 | * | 10/2016 | Ishii | ........................ F16C 13/02 |
| 2002/0015839 A1 | | 2/2002 | Niwa et al. | |
| 2002/0158424 A1 | * | 10/2002 | Yanagiguchi | ........... F16F 9/368 277/650 |
| 2007/0269674 A1 | | 11/2007 | Yanase et al. | |
| 2017/0298986 A1 | * | 10/2017 | Ito | ........................... F16C 33/10 |
| 2019/0093706 A1 | * | 3/2019 | Yoshioka | ................. F16C 19/06 |

FOREIGN PATENT DOCUMENTS

| | | |
|---|---|---|
| DE | 32 29 667 A1 | 3/1983 |
| DE | 198 16 549 A1 | 6/1999 |
| JP | S58-221034 A | 12/1983 |
| JP | 2001-355634 A | 12/2001 |
| JP | 2007-239945 A | 9/2007 |
| JP | 2008-069858 A | 3/2008 |
| JP | 2008-169940 A | 7/2008 |
| JP | 2010-159808 A | 7/2010 |

OTHER PUBLICATIONS

Notice of Submission of Information, mailed from Japan Patent Office dated Feb. 12, 2019, with the English machine translation thereof.

Office Action, Notification of Reasons for Refusal, issued in the counterpart Japanese Patent Application No. 2017-539983, dated Feb. 26, 2019, and the English machine translation thereof.

Office Action dated Jan. 2, 2019 in the corresponding Chinese Patent Application No. 201680053622.8 with the English translation thereof.

* cited by examiner

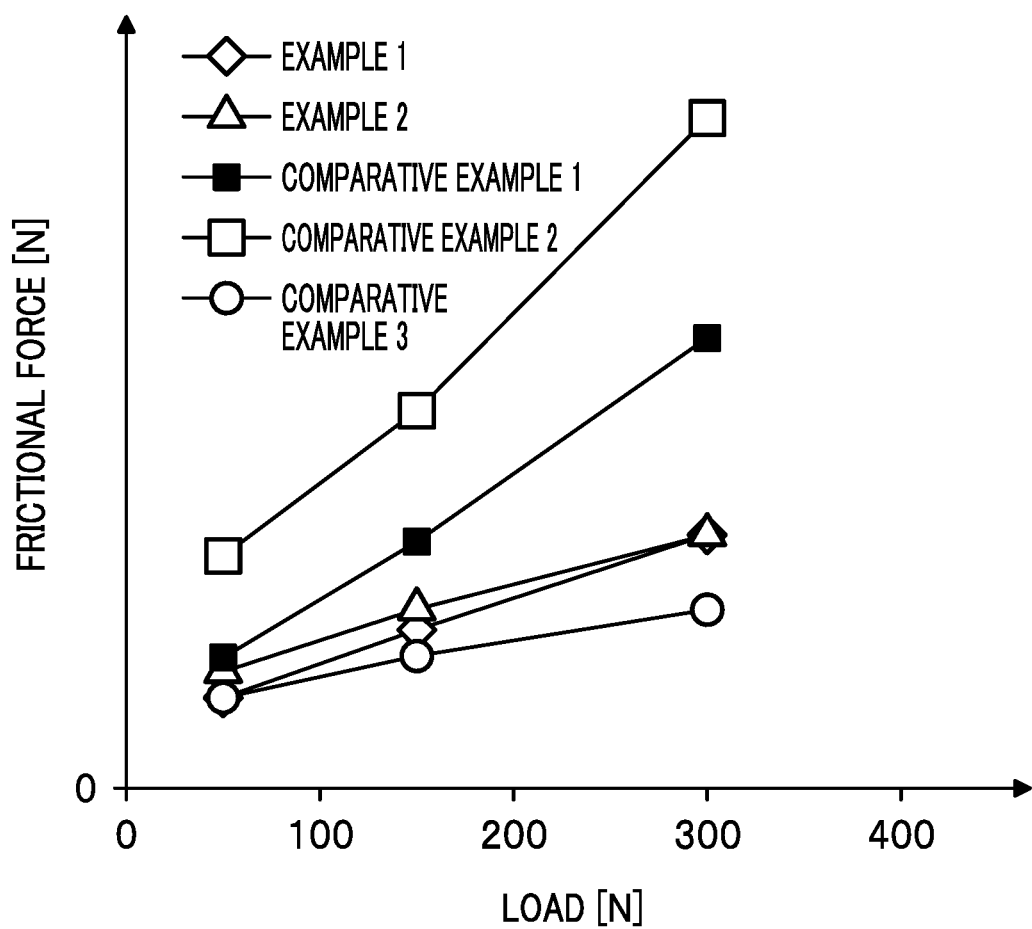

BEARING MEMBER, AND VIBRATION DAMPING DEVICE USING SAME

TECHNICAL FIELD

The present invention relates to a bearing member and a vibration damping device using the same.

BACKGROUND ART

As a vibration damping device, there has been known a variable damping force damper using a Magneto-Rheological Fluid (MRF) composition whose apparent viscosity varies according to intensity of a magnetic field applied thereto. In this vibration damping device, input vibration is damped by flow resistance of the MRF composition when a piston reciprocates in a cylinder enclosing the MRF composition. With this vibration damping device, it is possible to adjust a damping force of vibration depending on strength of an applied magnetic field.

Incidentally, a composition in which magnetic particles are dispersed in a dispersion medium is generally used as the MRF composition. Therefore, in the vibration damping device using the MRF composition, wear of a frictional sliding portion due to presence of the magnetic particles is a problem.

A sliding portion between a piston rod and a rod guide in the vibration damping device using a conventional MRF composition is a dry friction structure in which a rod guide bearing sliding portion is provided outside the MRF liquid chamber sealed by an oil seal. Thus, this vibration damping device avoids excessive wear under an environment in which the magnetic particles are present as described above.

However, since a conventional rod guide sliding structure is a dry friction, frictional force between the piston rod and the rod guide is high, and it is easily influenced by temperature and humidity and is poor in stability. Further, the conventional rod guide sliding structure has a disadvantage that dependency on operation speed and lateral force load received by the damper is increased. High friction characteristics specific to the vibration damping device using such an MRF composition is a major technical problem in improving ride comfort performance and application to a lightweight vehicle.

In order to solve this problem, friction wear has ever been reduced by improving the rod guide sliding structure. Specifically, a vibration damping device is disclosed in which a piston rod connected to a piston is slidably supported by a bearing member at an end portion of a cylinder, and the bearing member is surrounded by a porous member (for example, see Patent Document 1). With this vibration damping device, since only liquid component of the MRF composition whose magnetic particles are filtered by the porous member are supplied to the frictional sliding portion between the piston rod and the bearing member, the magnetic particles are prevented from intervening in the frictional sliding portion.

CITATION LIST

Patent Literature

Patent Document 1: Japanese Patent Application Publication No. 2008-069858

SUMMARY OF INVENTION

Technical Problem

Since a PTFE bearing member applied to a conventional vibration damping device is vulnerable to attack wear by the magnetic particles, it has been necessary that only the liquid component from which the magnetic particles have been removed by a filter or the like is supplied to the sliding portion, to form a lubrication environment.

In the vibration damping device (for example, see Patent Document 1), it is necessary to arrange sealing members at a plurality of positions so that the MRF composition (liquid component) is supplied to the frictional sliding portion only through the porous member. Specifically, the sealing members are respectively arranged at least between an inner wall of the cylinder and the porous member and between the piston rod and the porous member, in addition to the sealing member disposed between the inner wall of the cylinder and the piston rod.

In such a vibration damping device, since the seal members are arranged at the plurality of positions around the piston rod, there is a problem that it is difficult to sufficiently reduce the frictional force when the piston rod reciprocates in the cylinder. Incidentally, when the frictional force in the frictional sliding portion increases, for example, the ride comfort performance of the vehicle when this vibration damping device is applied to the vehicle decreases, and adaptability to the lightweight vehicle is insufficient. Further, there is a problem that the number of parts increases, device configuration is complicated and the manufacturing cost increases in this vibration damping device.

Therefore, an object of the present invention is to provide a bearing member capable of achieving simplification of configuration in a vibration damping device, reducing frictional force during operation under a lubrication environment with a magneto-rheological fluid composition, and having excellent wear resistance, and to provide a vibration damping device using the bearing member.

Solution to Problem

In order to solve the above problems, a bearing member of the present invention includes a resin layer on a side defined as a friction sliding surface of a base member, wherein the resin layer includes polytetrafluoroethylene and a tetrafluoroethylene-perfluoroalkyl vinyl ether copolymer resin, and the bearing member is lubricated by a magneto-rheological fluid composition.

In order to solve the above problems, a vibration damping device of the present invention includes a cylinder, a piston rod inserted into the cylinder, a piston connected to the piston rod and disposed axially slidably in the cylinder, a first liquid chamber and a second liquid chamber partitioned in the cylinder by the piston and filled with a magneto-rheological fluid composition, a communication hole formed in the piston so as to communicate the first liquid chamber and the second liquid chamber, and an electromagnetic coil for applying a magnetic field to the magneto-rheological fluid composition flowing through the communication hole.

The piston rod is slidably supported by the bearing member disposed in the cylinder.

Advantageous Effects of Invention

According to the present invention, it is possible to provide a bearing member capable of achieving simplification of configuration in a vibration damping device, reducing frictional force during operation under a lubrication environment with a magneto-rheological fluid composition, and having excellent wear resistance, and to provide a vibration damping device using the bearing member.

BRIEF DESCRIPTION OF DRAWINGS

FIG. 10 is a graph showing measurement results of a third measurement test of frictional force performed in the examples;

DESCRIPTION OF EMBODIMENTS

Next, a magneto-rheological fluid composition according to an embodiment of the present invention and a vibration damping device using the same will be described. Hereinafter, after describing an overall configuration of the vibration damping device, a bearing member (metal bush) and the magneto-rheological fluid composition used in the vibration damping device will be described.

<Overall Configuration of Vibration Damping Device>

Figure 1:
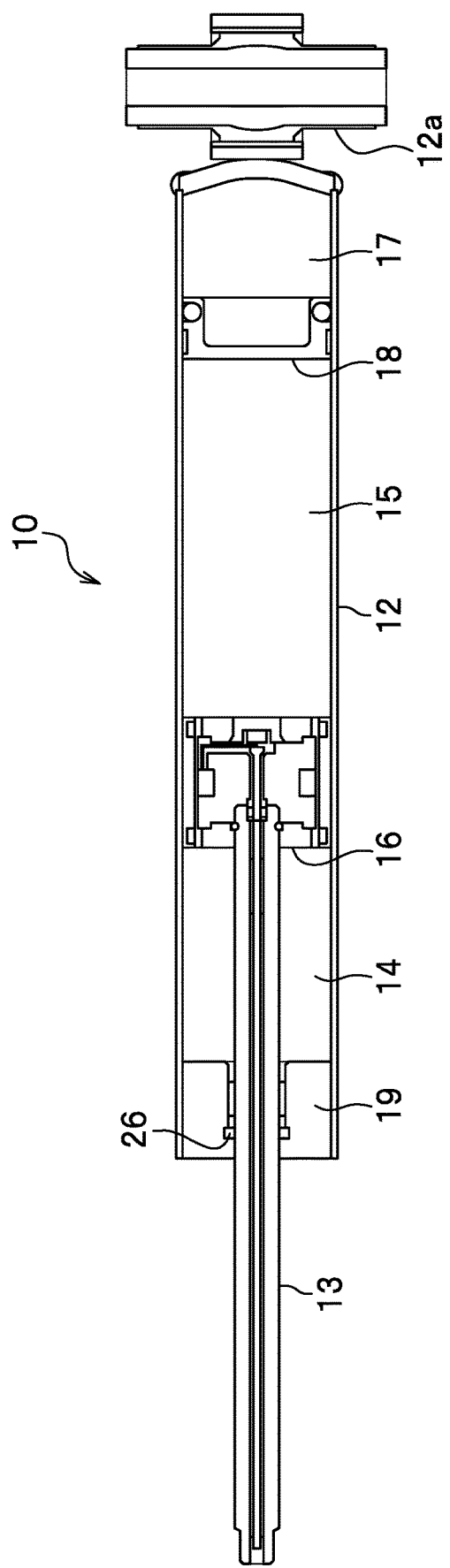
FIG. 1 is a cross-sectional view showing a schematic structure of a vibration damping device according to an embodiment of the present invention.

FIG. 1 is a cross-sectional view showing a schematic structure of a vibration damping device 10 according to the embodiment of the present invention. The vibration damping device 10 is a monotube type (De Carbon type) variable damping force damper mounted on a vehicle and is configured to adjust a vibration damping force in accordance with magnitude of vibration input through a wheel.

The vibration damping device 10 includes a cylindrical cylinder 12 filled with a Magneto-Rheological Fluid (MRF) composition described in detail below, a piston rod 13 slidable in an axial direction (a longitudinal direction) of the cylinder 12, a piston 16 mounted on a tip end of the piston rod 13 and dividing an interior of the cylinder 12 into a first liquid chamber 14 and a second liquid chamber 15, and a free piston 18 dividing the interior of the cylinder 12 into the second liquid chamber 15 and a high pressure gas chamber 17. It should be noted that the piston 16 corresponds to a "piston" recited in claims.

A rod guide 19 closing an opening of the cylinder 12 is provided at one end of the cylinder 12. The rod guide 19 has a substantially cylindrical shape. The piston rod 13 is inserted and supported through a center hole of the rod guide 19. An outer peripheral surface (a frictional sliding portion on the piston rod 13 side) of the piston rod 13 and an inner peripheral surface (a frictional sliding portion on the rod guide 19 side) of the rod guide 19 slide on each other. The rod guide 19 has an oil seal 26 for preventing the magneto-rheological fluid composition from leaking to the outside. Structure of the rod guide 19 will be described in detail below.

The other end of the cylinder 12 is usually provided with an eyepiece 12a. For example, when the vibration damping device 10 is used for a suspension of the vehicle, a bolt (not shown) is inserted into the eyepiece 12a and the bolt is connected to a trailing arm which is a wheel side member.

An end portion (a left end portion on a paper surface of FIG. 1) of the piston rod 13 is connected to a damper base (an upper portion of a wheel house) which is a vehicle body side member through a damper mount. While the vehicle is traveling, the outer peripheral surfaces of the piston 16 and the free piston 18 slide against the inner peripheral surface of the cylinder 12.

Figure 2:
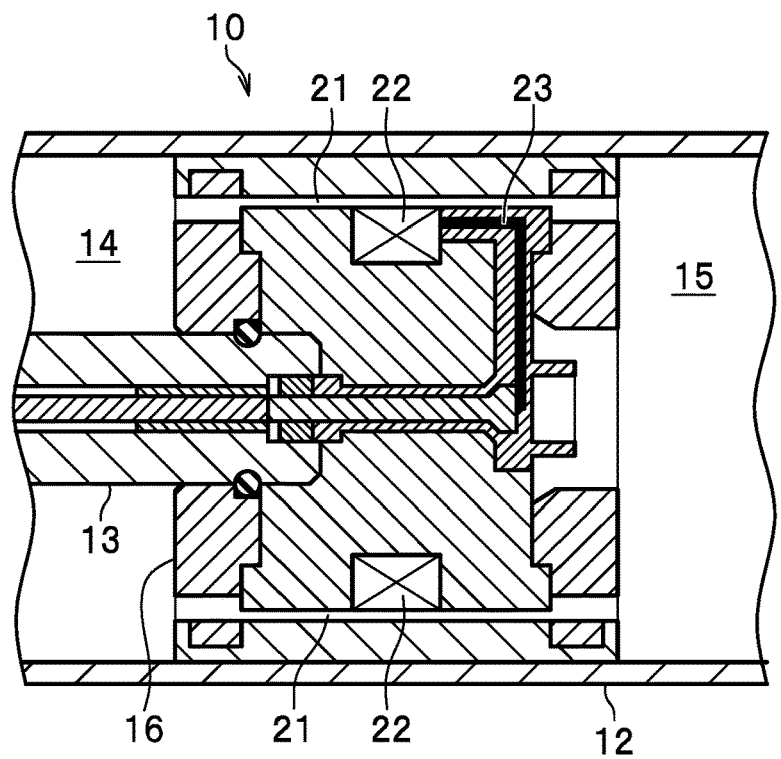
FIG. 2 is a partially enlarged cross-sectional view of a piston of FIG. 1.

FIG. 2 shows a partially enlarged cross-sectional view of the piston 16 of FIG. 1. The piston 16 includes a communication hole 21 for communicating the first liquid chamber 14 and the second liquid chamber 15, and an electromagnetic coil 22 for applying a magnetic field to the magneto-rheological fluid composition flowing through the communication hole 21. A current is supplied to the electromagnetic coil 22 through a power supply line 23.

The power supply line 23 is taken out to the outside through the piston rod 13, and is connected to a predetermined control power supply (not shown). When the current is supplied from the control power supply to the electromagnetic coil 22 through the power supply line 23, the magnetic field is applied to the magneto-rheological fluid composition in the communication hole 21. At this time, assuming the magneto-rheological fluid composition in a stationary state not flowing through the communication hole 21, magnetic particles contained in the magneto-rheological fluid composition forms clusters so as to line up along lines of magnetic force. Since the magneto-rheological fluid composition flowing through the communication hole 21 flows through the communication hole 21 so as to inhibit formation of the clusters, apparent viscosity of the magneto-rheological fluid composition is increased.

The vibration damping device 10 according to the present embodiment detects a magnitude, amplitude and speed of input vibration with a predetermined sensor and adjusts electric power to be supplied to the electromagnetic coil 22 according to the detected signal. Thus, the vibration damping device 10 adjusts the damping force by increasing the apparent viscosity of the magneto-rheological fluid composition according to the magnitude of the input vibration. In FIG. 2, reference numeral 12 denotes a cylinder.

Figure 3:
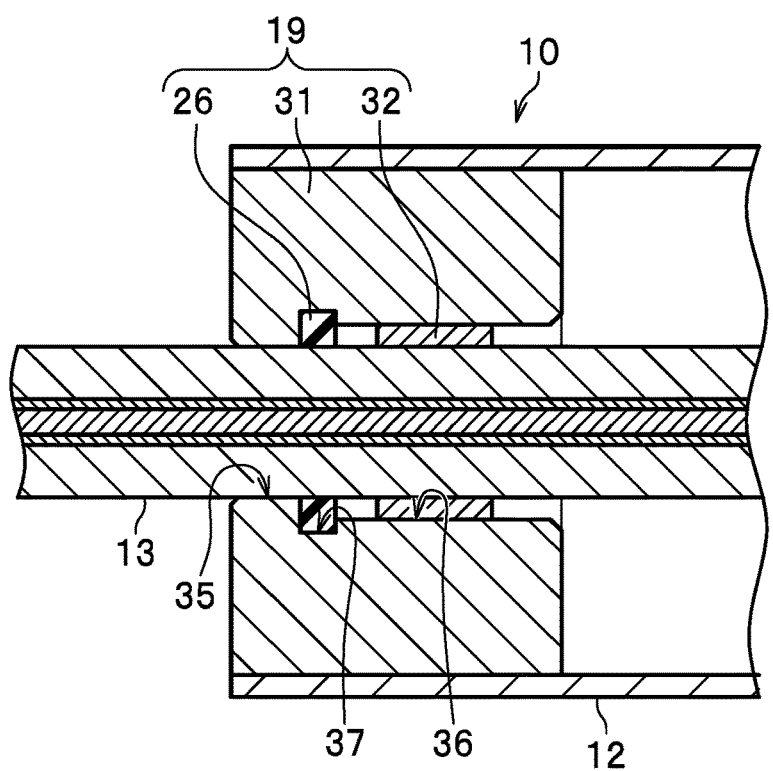
FIG. 3 is a partially enlarged cross-sectional view of a rod guide of FIG. 1.

FIG. 3 shows a partially enlarged cross-sectional view of the rod guide 19 of FIG. 1. The rod guide 19 includes a substantially cylindrical base material portion 31 which is fitted in one end side of the cylinder 12 and through which the piston rod 13 is inserted, a substantially cylindrical metal bush 32 which is disposed on an inner peripheral side of the base material portion 31 and slidably supports the piston rod 13, and the oil seal (sealing member) 26 which is disposed on the inner peripheral side of the base material portion 31 and slidably supports the piston rod 13 while sealing between the piston rod 13 and the rod guide 19 in a liquid-tight manner. Incidentally, the metal bush 32 corresponds to a "bearing member" recited in claims.

The base material portion 31 in the present embodiment is made of an iron-based metal material such as a steel material or a non-magnetic metal material such as aluminum, aluminum alloy and stainless steel, and is press-fitted into the opening of the cylinder 12 to seal one end of the cylinder 12 in a liquid-tight manner. The attachment of the base material portion 31 to the cylinder 12 is not limited to this, but it may be a form of attachment such as screwing or welding.

An inner periphery of the base material portion 31 includes a small diameter portion 35 having an inner diameter slidably contacting the outer peripheral surface of the piston rod 13 at the one end side of the cylinder 12, a large diameter portion 36 having an inner diameter larger than the small diameter portion 35, and an oil seal arrangement portion 37 formed between the small diameter portion 35 and the large diameter portion 36 and having an inner diameter larger than the large diameter portion 36.

The oil seal 26 in the present embodiment is made of, for example, a rubber polymer material such as urethane resin or silicone resin. The oil seal 26 is provided in the oil seal arrangement part 37 of the base material portion 31 and is pressed against the piston rod 13 and the base material portion 31 to prevent the magneto-rheological fluid composition from leaking outside the cylinder 12.

<Metal Bush>

Figure 4A:
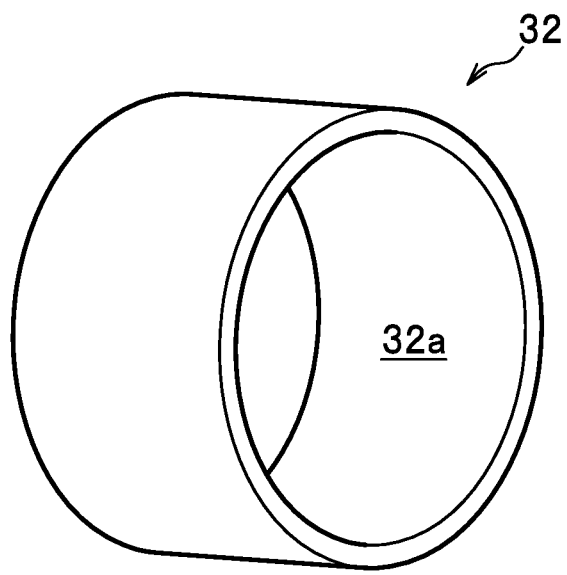
FIG. 4A is a perspective view of a bearing member (metal bush) constituting the rod guide.
Figure 4B:
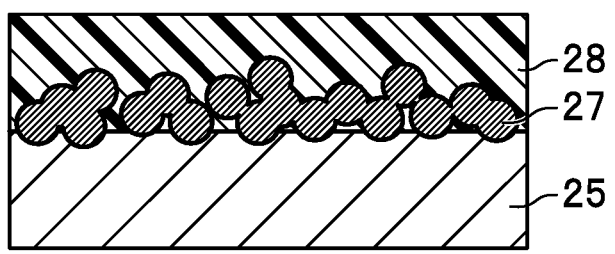
FIG. 4B is a partially enlarged cross-sectional view schematically showing a cross-section of the bearing member (metal bush)

Next, the metal bush 32 which is the bearing member in the present embodiment will be described. FIG. 4A is a perspective view of the metal bush 32 constituting the rod guide 19, and FIG. 4B is a partially enlarged cross-sectional view schematically showing a cross-section of the metal bush 32. As shown in FIG. 4A, the metal bush 32 in this embodiment has a cylindrical shape. The metal bush 32 is disposed in the large diameter portion 36 (see FIG. 3) of the base material portion 31 (see FIG. 3) as described above. The piston rod 13 (see FIG. 3) is inserted into the metal bush 32 and slides against an inner peripheral surface 32a of the metal bush 32.

As shown in FIG. 4B, the metal bush 32 includes a base member 25 and a resin layer 28 on a surface side where a friction sliding surface of the base member 25 is formed, that is, on the surface on the inner peripheral surface 32a (see FIG. 4A) side of the metal bush 32. Further, the metal bush 32 in the present embodiment is formed by impregnating and coating the resin layer 28 on a porous metal layer 27 formed on the base member 25. Note that the porous metal layer 27 can be formed on the base member 25 through an intermediate layer (not shown) such as copper plating. The base member 25 has a cylindrical shape substantially the same shape as the metal bush 32. The base member 25 in the present embodiment is made of a steel material. Material of the base member 25 is not limited to this, but it may be made of, for example, a metal material such as aluminum alloy, copper alloy or stainless steel.

A method of forming the porous metal layer 27 is, for example, to disperse powder of Cu—Sn alloy (bronze) on the surface of the base member 25 made of a steel material, and to heat and sinter the powder at a temperature of 750 to 900° C. in a reducing atmosphere to form a porous alloy layer.

Such a porous metal layer 27 also includes, for example, copper, tin, a copper alloy or a tin alloy other than the above bronze, and a metal such as aluminum, an aluminum alloy, a nickel or a nickel alloy.

The resin layer 28 includes polytetrafluoroethylene (PTFE) and tetrafluoroethylene-perfluoroalkyl vinyl ether copolymer resin (PFA). The resin layer 28 is formed to be impregnated and coated on the porous metal layer 27 formed on the base member 25.

The resin layer 28 in the present embodiment is mainly composed of polytetrafluoroethylene, and by compatibilizing tetrafluoroethylene-perfluoroalkyl vinyl ether copolymer resin with this polytetrafluoroethylene, hardness of the resin layer 28 is increased. Content of the tetrafluoroethylene-perfluoroalkyl vinyl ether copolymer resin in the resin layer 28 can be 0.1 to 50 vol %, and the remainder is polytetrafluoroethylene (PTFE). When the content is less than 0.1 vol %, wear resistance of the resin layer 28 is reduced, and when the content exceeds 50 vol %, the PTFE is not a main component so that frictional force of the resin layer 28 is increased.

The resin layer 28 can further include a solid lubricant, an inorganic filler or the like. The solid lubricant includes, for example, powder of graphite, molybdenum disulfide, and amorphous carbon (diamond-like carbon) but is not limited thereto. The solid lubricant can improve self-lubricity of the resin layer 28, and the metal bush 32 can exhibit even lower friction.

The inorganic fillers include inorganic compounds such as barium sulfate, calcium phosphate, calcium carbonate, calcium fluoride, potassium titanate, silica, alumina, titanium oxide, silicon nitride and boron nitride, particles of hard material, or short fiber materials, but are not limited thereto.

The inorganic filler can further improve the wear resistance of the resin layer 28, and the metal bush 32 can further improve the wear resistance. The solid lubricant and inorganic filler can usually be contained in the resin layer 28 in a range of 1 to 30 vol % for the solid lubricant and in a range of 0.1 to 25 vol % for the inorganic filler, however, the range is not limited thereto, but they can be appropriately added within a range in which the wear resistance and peel strength of the resin layer 28 are maintained.

Incidentally, when the solid lubricant and/or the inorganic filler is contained in the resin layer 28, the tetrafluoroethylene-perfluoroalkyl vinyl ether copolymer resin is contained in the resin layer 28 within the above-described content ratio, the solid lubricant and/or the inorganic filler is contained in the resin layer 28 within the above-described content ratio, and the remainder is the content ratio of the polytetrafluoroethylene in the resin layer 28.

<Magneto-rheological Fluid Composition>

The magneto-rheological fluid composition includes the magnetic particles and a dispersion medium in which the magnetic particles are dispersed.

(Magnetic Particles)

Material of the magnetic particles include, for example, iron, iron nitride, iron carbide, carbonyl iron, chromium dioxide, low carbon steel, nickel and cobalt. Further, as the material of the magnetic particles, for example, an aluminum-containing iron alloy, a silicon-containing iron alloy, a cobalt-containing iron alloy, a nickel-containing iron alloy, a vanadium-containing iron alloy, a molybdenum-containing iron alloy, a chromium-containing iron alloy, a tungsten-containing iron alloy, a manganese-containing iron alloy and a copper-containing iron alloy can also be used. Furthermore, as the material of the magnetic particles, for example, paramagnetic, superparamagnetic or ferromagnetic compound particles made of gadolinium and gadolinium organic derivatives, and particles made of a mixture thereof can also be used.

The magnetic particles made of a soft magnetic material are preferable because they are magnetized when the magnetic field is applied thereto and is in a substantially non-magnetic state when the magnetic field is not applied thereto. Carbonyl iron is particularly preferable as a material of such a magnetic particle in that it is a soft magnetic material having a small coercive force and a large magnetic permeability.

An average particle diameter of the magnetic particles is a value obtained by the BET (Brunauer-Emmett-Teller) method and can be set to about 50 nm to 50 μm. Particularly preferred average particle diameter of the magnetic particles is 1 μm to 10 μm.

The magnetic particles can also be subjected to surface modification for improving affinity to the dispersion medium and dispersibility of the particles. The surface modification includes, for example, a method of applying a silane coupling agent to surfaces of the magnetic particles.

(Dispersion Medium)

As the dispersion medium, although any liquid may be used as long as it can disperse the magnetic particles, mineral oil and synthetic oil are preferable among them. The mineral oil and synthetic oil are not particularly limited as long as they are generally used as base oil for engine lubricating oil, driving oil, shock absorber fluid or machining oil, but kinematic viscosity thereof at 40° C. is preferably 1 to 5000 mm$^2$/s, and more preferably 3 to 3000 mm$^2$/s. Pour point, which is an index of low temperature flowability, of the mineral oil and synthetic oil is not particularly limited, but is preferably −20° C. or less, where the mineral oil and synthetic oil can be used even at a low temperature.

The mineral oil includes, for example, distillate obtained by atmospheric distillation of paraffin base crude oil, intermediate base crude oil, naphthenic base crude oil or the like, distillate obtained by vacuum distillation of residual oil of atmospheric distillation, and refined oil such as solvent refined oil, hydrogenated refined oil, dewaxed oil or clay treated oil obtained by refining these distillates according to a conventional method.

The synthetic oil include, for example, poly α-olefins, α-olefin copolymer, polybutene, alkylbenzene, polyol ester, dibasic acid ester, polyoxyalkylene glycol, polyoxyalkylene glycol ester, polyoxyalkylene glycol ether and silicone oil. The above-described dispersion medium can be used singly or in combination of two or more.

Content ratio of the magnetic particles in the magneto-rheological fluid composition is 60 to 85 mass %. Content ratio of the dispersion medium in the magneto-rheological fluid composition is 15 to 40 mass %.

The magneto-rheological fluid composition can also be added with, for example, an ester solvent such as bis (2-ethylhexyl) sebacate, a viscosity adjusting agent such as organophilic bentonite, a solid lubricant such as molybdenum disulfide, or an additive having functionality such as dispersibility, heat resistance, oxidation resistance, corrosion resistance or antifoaming property, as needed.

The magneto-rheological fluid composition can be prepared by mixing the magnetic particles, the dispersion medium and the like so as to respectively have the above content ratios.

The vibration damping device 10 of the present embodiment is manufactured by filling the cylinder 12 with the magneto-rheological fluid composition at a predetermined timing before or after assembling the piston 16 to the cylinder 12 so as to have the above-described structure.

Next, operational effects of the vibration damping device 10 according to the present embodiment will be described. The metal bush 32 (bearing member) according to the present embodiment has the resin layer 28 containing polytetrafluoroethylene and a tetrafluoroethylene-perfluoroalkyl vinyl ether copolymer resin on the surface side where the friction sliding surface is formed, and thus it is possible to reduce the frictional force during operation and to have excellent wear resistance.

Further, the frictional force of the metal bush 32 according to the present embodiment is small even when the magnetic particles are interposed in the frictional sliding portion with the piston rod 13, and thus it is not required to surround the bearing member with a porous member or a sealing member so that the magnetic particles do not enter the frictional sliding portion unlike a conventional vibration damping device (for example, see Patent Document 1). Therefore, with the vibration damping device 10 using the metal bush 32 according to the present embodiment, it is possible to omit the porous member and an extra sealing member of the conventional vibration damping device. As a result, the configuration of the vibration damping device 10 can be simplified.

Furthermore, the metal bush 32 according to the present embodiment has the resin layer 28 containing polytetrafluoroethylene and the tetrafluoroethylene-perfluoroalkyl vinyl ether copolymer resin on the surface side where the friction sliding surface is formed, and thus it is possible to reduce dependency of the frictional force due to lateral force load.

Figure 5:
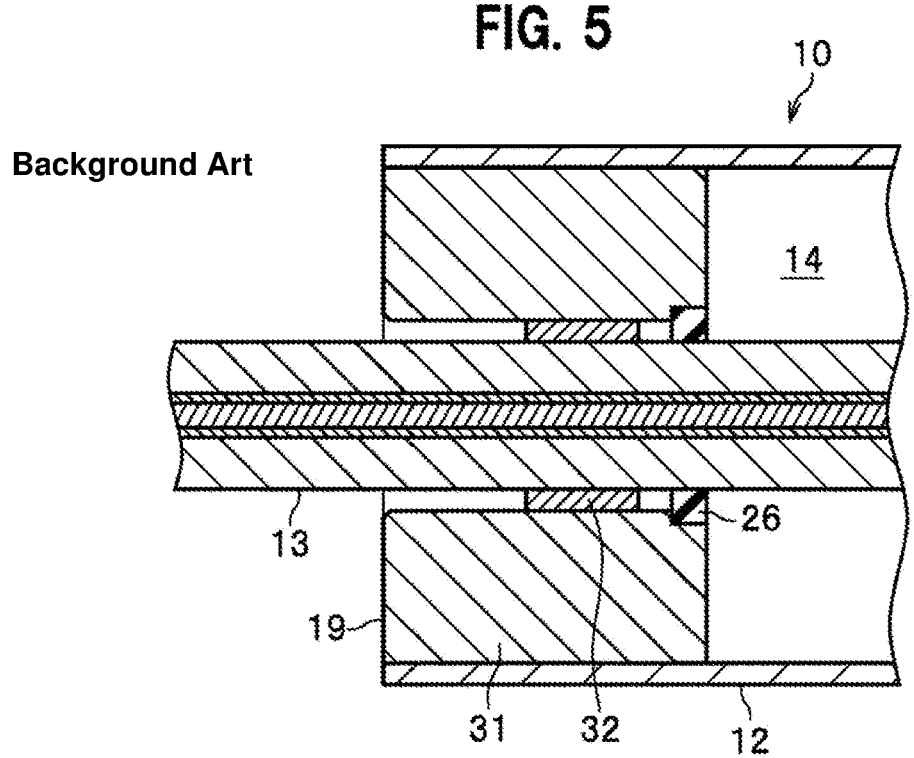
FIG. 5 is a partially enlarged view showing a sample of conventional structure of the rod guide.

Although the embodiment of the present invention has been described above, the present invention is not limited to the above-described embodiment, but can be implemented in various forms as long as it is a sliding form in an MRF lubrication environment in which the magneto-rheological fluid (MRF) composition is interposed in the sliding portion. FIG. 5 is a partially enlarged view showing a sample of conventional structure of the rod guide 19. As shown in FIG. 3, in the above embodiment, the oil seal 26 between the base material portion 31 of the rod guide 19 and the piston rod 13 is disposed closer to the opening end of the cylinder 12 (left on a paper surface of FIG. 3) than the metal bush 32. That is, the metal bush 32 in the rod guide 19 according to the above embodiment is disposed in the first liquid chamber 14, and can slide under a lubrication environment in which the magneto-rheological fluid composition according to the present embodiment is used.

In contrast, as shown in FIG. 5, in the rod guide 19 of the sample of conventional structure, the oil seal 26 between the base material portion 31 and the piston rod 13 is disposed closer to the first liquid chamber 14 (right on a paper surface of FIG. 3) than the metal bush 32. Such a rod guide 19 of the sample of conventional structure can prevent the magnetic particles from intervening in the frictional sliding portion between the metal bush 32 and the piston rod 13, however, since the metal bush 32 is a dry friction in which the magneto-rheological fluid composition does not intervene, the metal bush (bearing member) of the present invention cannot be effectively used.

Figure 6:
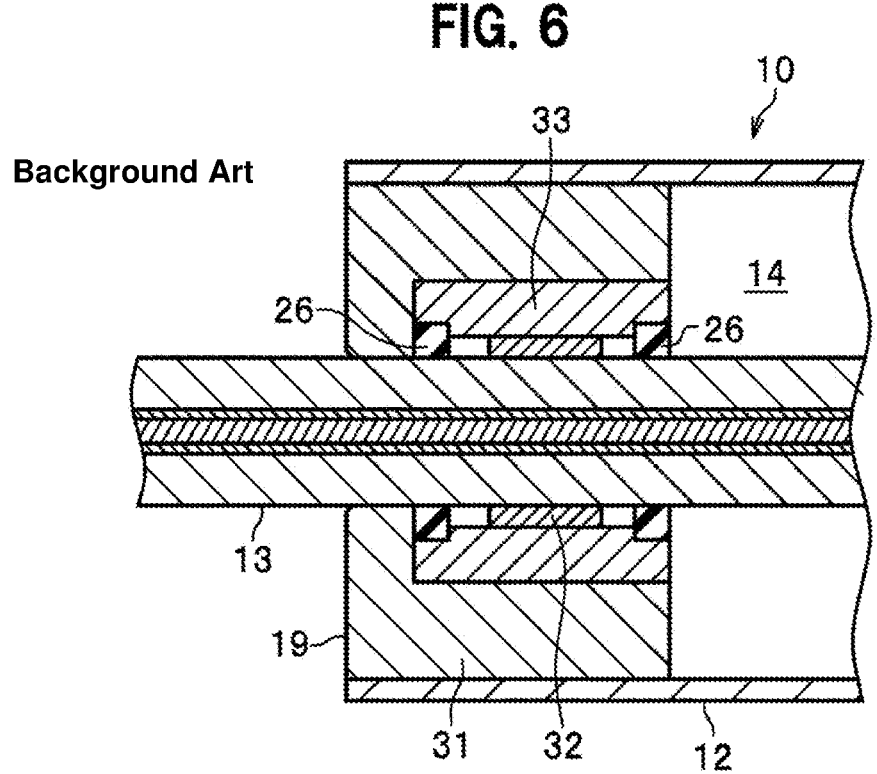
FIG. 6 is a partially enlarged view showing a sample of improved conventional structure of the rod guide.

Meanwhile, FIG. 6 is a partially enlarged view showing a sample of improved conventional structure (see, for example, Patent Document 1) of the rod guide 19 of FIG. 5. As shown in FIG. 6, in the rod guide 19 of the sample of improved conventional structure, a metal bush holder 33 made of a substantially cylindrical body of the porous member is disposed so as to surround the metal bush 32 through which the piston rod 13 is inserted. The metal bush holder 33 is fitted into the base material portion 31 of the substantially cylindrical rod guide 19. Reference numeral 26 denotes an oil seal, which seals a gap between the metal bush holder 33 and the piston rod 13 at both axial end portions of the metal bush holder 33. The reference numeral 12 denotes the cylinder, and the reference numeral 14 denotes the first liquid chamber.

In the vibration damping device 10 having the rod guide 19 of the sample of improved conventional structure, only liquid component of the MRF composition in which the magnetic particles are filtered out by the metal bush holder 33 made of the porous member is supplied to the gap, which is between the metal bush holder 33 and the piston rod 13 and in which the metal bush 32 is disposed. Thus, with the vibration damping device 10 including the rod guide 19 of the sample of improved conventional structure, it is possible to prevent the magnetic particles from intervening in the frictional sliding portion, and to maintain lubricity in the frictional sliding portion because the liquid component of the MRF composition is supplied through the metal bush holder 33 made of the porous member.

However, in order to isolate the metal bush holder 33, it is necessary to arrange a plurality of oil seals 26, and the frictional force due to the oil seals 26 inevitably increases. As will be described in detail below, the metal bush (bearing member) of the present invention has more excellent low friction characteristics for the MRF composition containing no magnetic particles compared with the conventional metal bush material, and thus it is possible to effectively use the metal bush (bearing member) of the present invention.

Effectiveness of the embodiments of the present invention has been described above.

The present invention is not limited to the above-described embodiments, but can be implemented in various forms as long as it is the sliding form in the MRF lubrication environment in which the magneto-rheological fluid (MRF) composition is interposed in the sliding portion. In the above embodiments, the vibration damping device 10 used for the vehicle has been described, however, the present invention is not limited to this, but can also be applied to vibration damping devices in other fields such as household electric appliances and civil engineering construction equipments.

EXAMPLES

Hereinafter, examples and comparative examples in which operational effects of the present invention have been verified will be described. It should be noted that the present invention is not limited to the following examples, and can be arbitrarily modified and implemented without departing from the spirits and scope of the present invention.

In Examples 1, 2 and Comparative Examples 1 to 3, the metal bush 32 (see FIG. 4A) having the resin layer 28 (see FIG. 4B) of the material shown in Table 1 was produced.

TABLE 1

| | Material | Friction characteristics | Wear resistance |
| --- | --- | --- | --- |
| Example 1 | PTFE + PFA | Excellent | Excellent |
| Example 2 | PTFE + PFA + Inorganic filler | Good | Good |
| Comparative Example 1 | Conventional material 1 | Bad | Bad (Separation) |
| Comparative Example 2 | Conventional material 2 | Bad | Bad (Wear) |
| Comparative Example 3 | PTFE + Graphite filler | Slightly bad | Bad (Wear) |

Example 1

<Production of Metal Bush (Bearing Member)>

As shown in FIGS. 4A and 4B, the metal bush 32 having the resin layer 28 through the porous metal layer 27 on the base member 25 was produced. A steel plate having a thickness of 0.7 mm was used as the base member 25. The powder of Cu—Sn alloy (bronze) was sprayed on the surface of the steel plate at a thickness of 0.3 mm, and was heated and sintered at 750 to 900° C. in a reducing atmosphere to form a porous metal layer.

<<Resin Layer>>

In formation of the resin layer 28 in Example 1, a mixture of 85 vol % of polytetrafluoroethylene (PTFE) and 15 vol % of tetrafluoroethylene-perfluoroalkyl vinyl ether copolymer resin (PFA) was prepared first. Next, the mixture was impregnated and coated on the porous metal layer 27 and fired at a temperature of 350 to 400° C.

The resin layer 28, which includes polytetrafluoroethylene (PTFE) and tetrafluoroethylene-perfluoroalkyl vinyl ether copolymer resin (PFA) and is impregnated and coated on the porous metal layer 27, was formed on the base member 25. Next, a thickness of the base member 25 having the resin layer 28 was made uniform by a rolling process, and thus a raw material plate of the metal bush 32 was obtained. Then, the raw material plate was formed into a cylindrical shape by a roll processing to prepare the metal bush 32 shown in FIG. 4A.

Example 2

In forming the resin layer 28 in Example 2, first, a mixture of 85 vol % of polytetrafluoroethylene (PTFE), 10 vol % of tetrafluoroethylene-perfluoroalkyl vinyl ether copolymer resin (PFA), 3 vol % of graphite, and 2 vol % of alumina was prepared. The resin layer 28 was formed on the porous metal layer 27 in the same manner as in Example 1 except that this mixture was used.

Comparative Example 1

In forming the resin layer 28 in Comparative Example 1, first, a mixture of 85 vol % of polytetrafluoroethylene (PTFE), 10 vol % of calcium fluoride, and 5 vol % of alumina was prepared. The resin layer 28 was formed on the porous metal layer 27 in the same manner as in Example 1 except that this mixture was used.

Comparative Example 2

In forming the resin layer 28 in Comparative Example 2, first, a mixture of 85 vol % of polytetrafluoroethylene (PTFE), 5 vol % of graphite, and 10 vol % of molybdenum disulfide was prepared. The resin layer 28 was formed on the porous metal layer 27 in the same manner as in Example 1 except that this mixture was used.

Comparative Example 3

In Comparative Example 3, the resin layer 28 was formed on the porous metal layer 27 to produce the metal bush 32 in the same manner as in Example 1 except that a mixture of 97 vol % of polytetrafluoroethylene (PTFE) and 3 vol % of graphite was used in place of the mixture of Example 1.
(First Measurement Test of Frictional Force)

Figure 7:
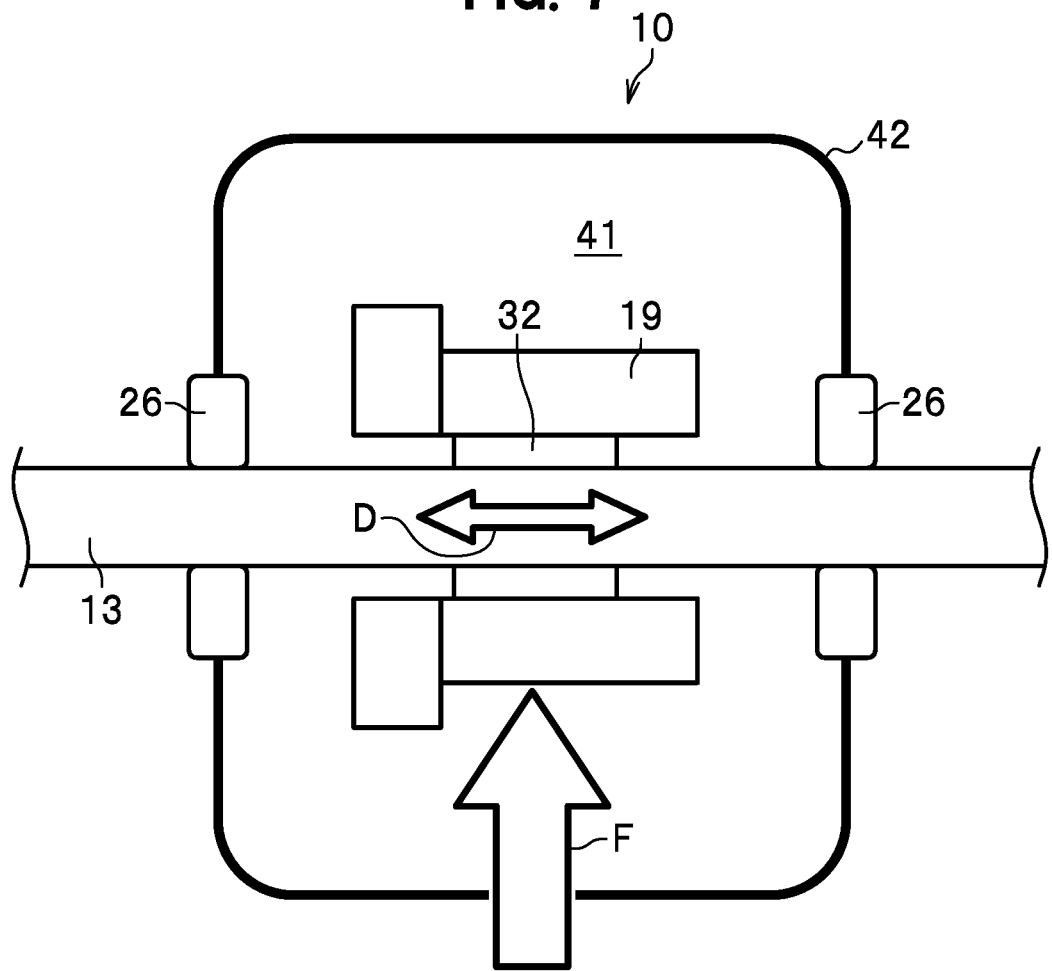
FIG. 7 is a schematic diagram of a test device which has measured frictional force in examples of the present invention.

Next, a first measurement test of the frictional force assumed on the frictional sliding portion between the metal bush 32 and the piston rod 13 (see FIG. 3) produced in Examples 1, 2 and Comparative Examples 1 to 3 was performed. FIG. 7 is a schematic diagram of a test device which has measured the frictional force. This test device 40 includes the rod guide 19 made of aluminum to which the metal bush 32 is attached in an oil bath 42 filled with test oil 41.

In FIG. 7, reference numeral 13 denotes a piston rod slidably supported by the metal bush 32, reference numeral 26 denotes a urethane resin oil seal for sealing between the oil bath 42 and the piston rod 13 in a liquid-tight manner. A columnar steel material with an outer diameter of 14 mm, which was hard chrome plated on its surface, was used for the piston rod 13. A liquid component excluding magnetic particles from MRF-126CD manufactured by LORD Corporation, which is a magneto-rheological fluid composition in which iron-based particles (magnetic particles) are dispersed in poly α-olefin, was used as the test oil 41.

In the test device 40, when reciprocating the piston rod 13 in its axial direction D, a load F is applied between the metal bush 32 and the piston rod 13 through the rod guide 19.

Figure 8:
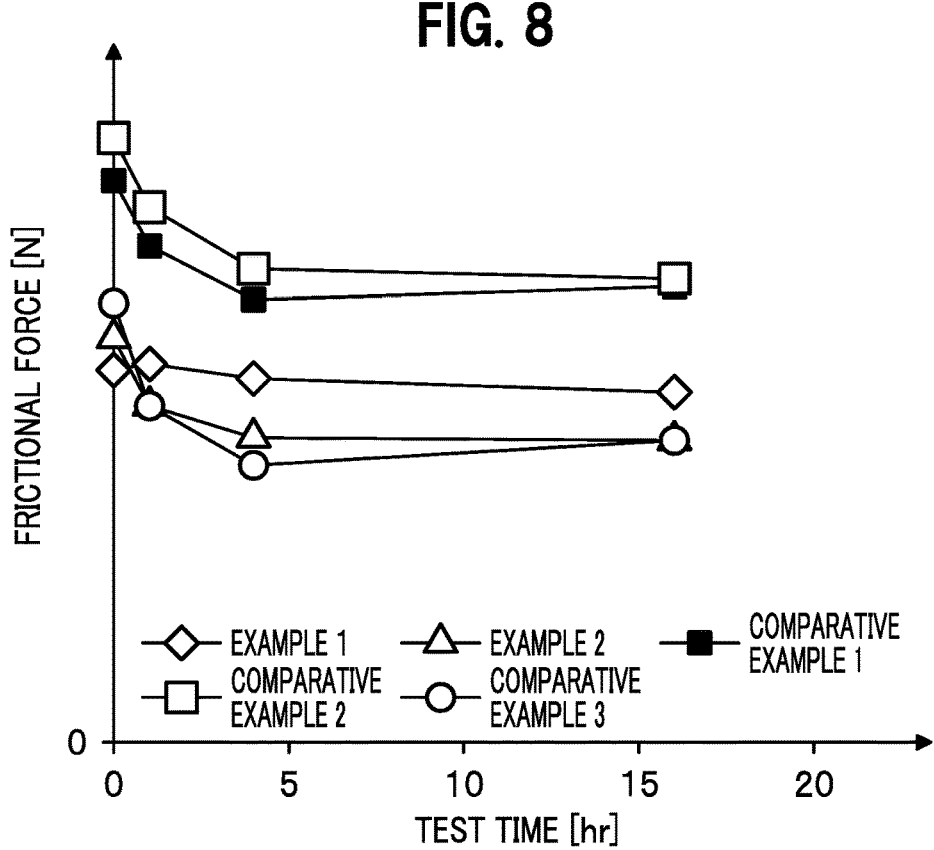
FIG. 8 is a graph showing measurement results of a first measurement test of frictional force performed in the examples.

In this measurement test, first, the liquid component (liquid component excluding the magnetic particles) of the magneto-rheological fluid composition was used as the test oil 41 of the test device 40. The measurement test was performed under a condition that a sliding speed of the piston rod 13 was 25 mm/s, a sliding stroke was 10 mm, and the load (F) was 150 N. The frictional force was measured four times, immediately after a start of sliding, after 1 hour, after 4 hours, and after 16 hours. The measurement test was performed in a state where the frictional sliding portion was completely immersed in the magneto-rheological fluid composition. Measurement results of the frictional force are shown in FIG. 8. FIG. 8 is a graph showing a relationship between the frictional force and time course.
(Second Measurement Test of Frictional Force)

Figure 9:
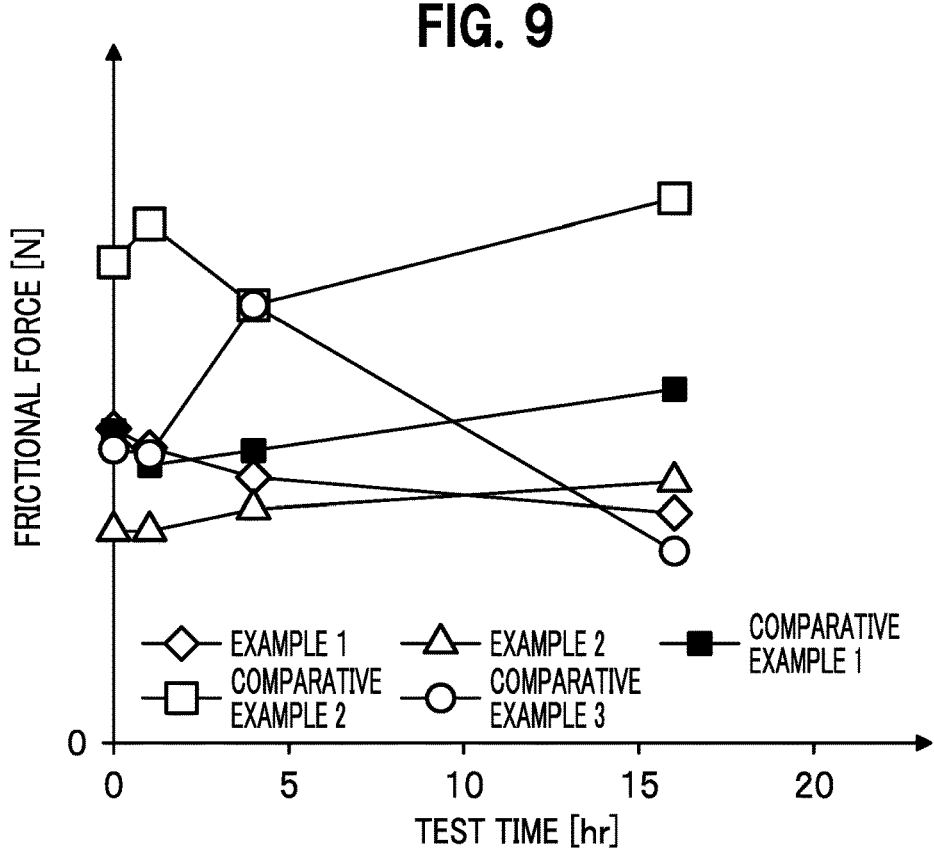
FIG. 9 is a graph showing measurement results of a second measurement test of frictional force performed in the examples.

In this second measurement test, the magneto-rheological fluid composition (MRF-126CD manufactured by LORD Corporation) was used as the test oil 41 of the test device 40. The frictional force was measured four times, immediately after the start of sliding, after 1 hour, after 4 hours, and after 16 hours. The measurement results of the frictional force are shown in FIG. 9. FIG. 9 is a graph showing the relationship between the frictional force and time course (test time).
(Third Measurement Test of Frictional Force)

In the third measurement test, the frictional force was measured when the load F applied between the metal bush 32 and the piston rod 13 was 50 N, 150 N, and 300 N. The measurement test was performed under a condition that the sliding speed of the piston rod 13 was 0.15 mm/s and the sliding stroke was 5 mm The measurement results of the frictional force are shown in FIG. 10. FIG. 10 is a graph showing a relationship between the frictional force and the load F.

Figure 11A:
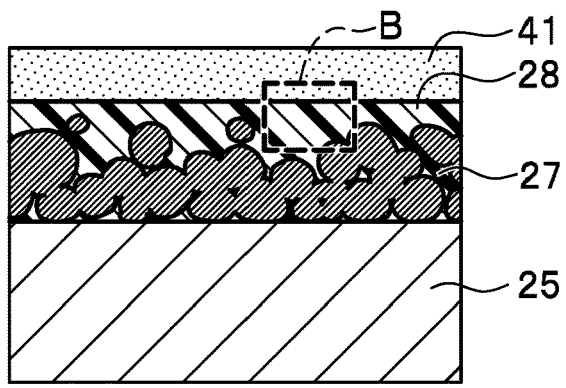
FIG. 11A is an illustrative optical micrographic photograph of the cross-section of the bearing member (metal bush) of Example 1 after 16 hours from start of sliding in the second measurement test of frictional force performed in the examples.
Figure 11B:
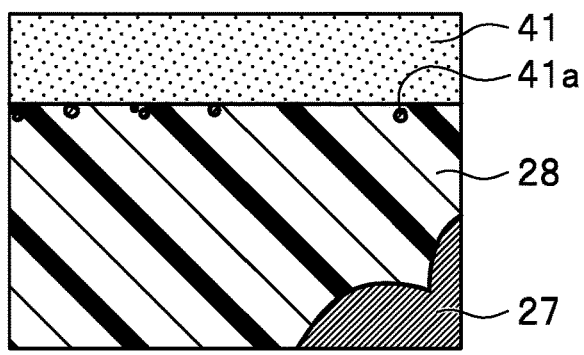
FIG. 11B is an illustrative optical micrographic photograph of a portion B of FIG. 11A.
Figure 12A:
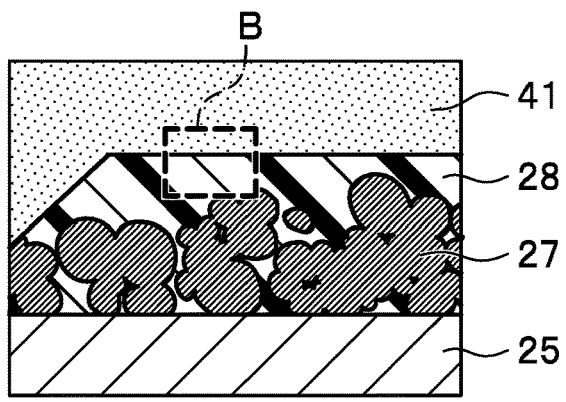
FIG. 12A is an illustrative optical micrographic photograph of the cross-section of the bearing member (metal bush) of Comparative Example 1 after 16 hours from the start of sliding in the second measurement test of frictional force performed in the examples.
Figure 12B:
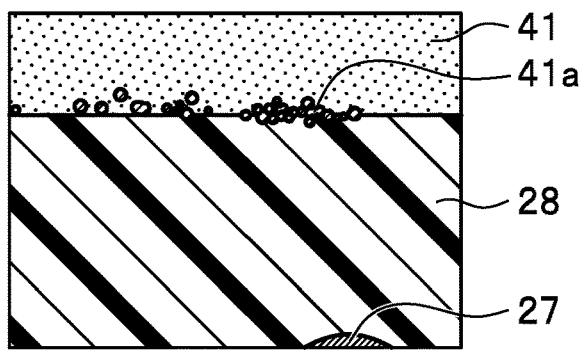
FIG. 12B is an illustrative optical micrographic photograph of a portion B of FIG. 12A.

FIG. 11A is an illustrative optical micrographic photograph of the cross-section of the metal bush 32 of Example 1 after 16 hours from the start of sliding in the second measurement test. FIG. 11B is an illustrative optical micrographic photograph of a portion B of FIG. 11A. FIG. 12A is an illustrative optical micrographic photograph of the cross-section of the metal bush 32 of Comparative Example 1 after 16 hours from the start of sliding in the second measurement test. FIG. 12B is an illustrative optical micrographic photograph of a portion B of FIG. 12A. In FIGS. 11A, 11B, 12A, 12B, reference numeral 25 denotes the base member, reference numeral 27 denotes the porous metal layer, reference numeral 28 denotes the resin layer, reference numeral 41 denotes the test oil, and reference numeral 41a denotes magnetic particles.

Figure 13:
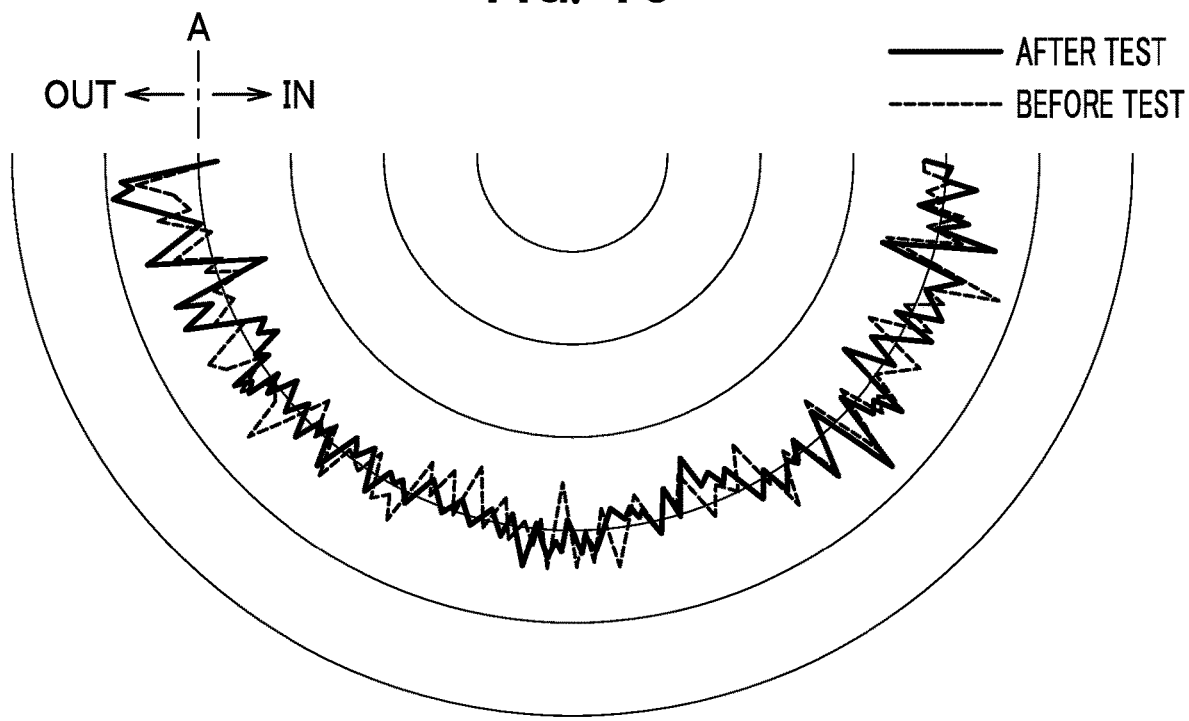
FIG. 13 is a graph showing profiles of a surface (an inner peripheral surface) of a resin layer before the second measurement test and of the surface (inner peripheral surface) of the resin layer after 16 hours (after the test) from the start of sliding in the bearing member (metal bush) of Example 1.
Figure 14:
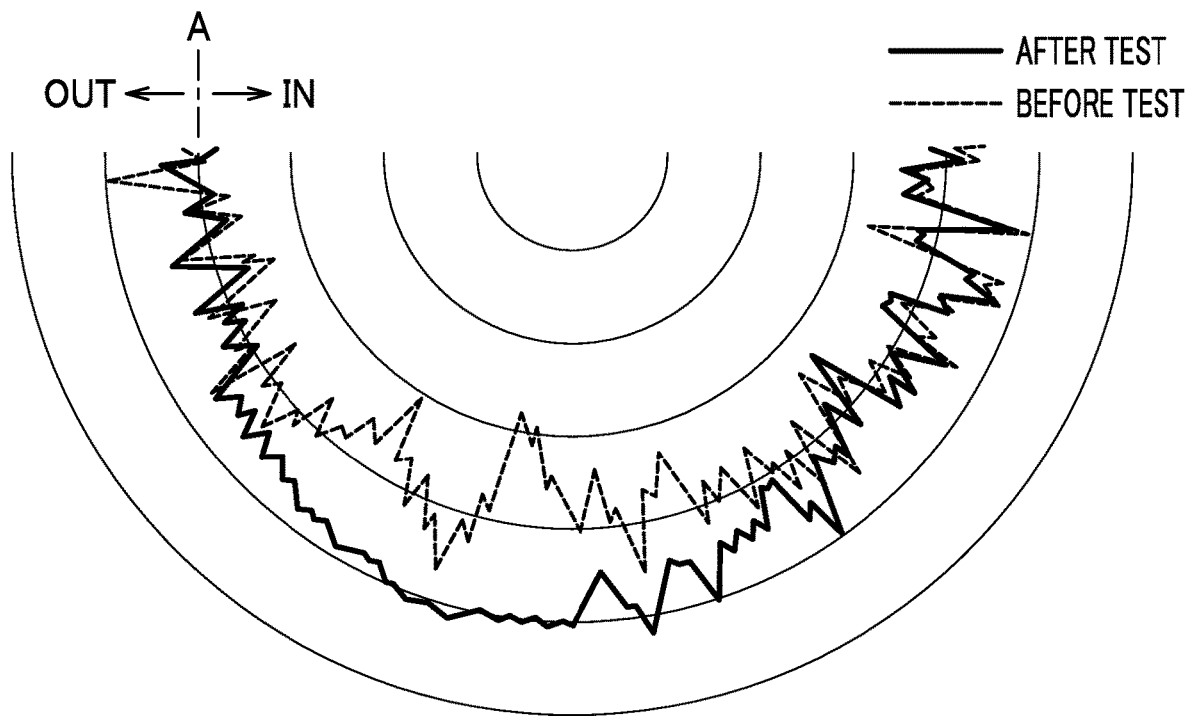
FIG. 14 is a graph showing profiles of a surface (an inner peripheral surface) of a resin layer before the second measurement test and of the surface (inner peripheral surface) of the resin layer after 16 hours (after the test) from the start of sliding in the bearing member (metal bush) of Comparative Example 3.

FIG. 13 is a graph showing profiles of a surface (an inner peripheral surface) of the resin layer 28 before the second measurement test and of the surface (inner peripheral surface) of the resin layer 28 after 16 hours (after the test) from the start of sliding in the metal bush 32 of Example 1. FIG. 14 is a graph showing profiles of a surface (an inner peripheral surface) of the resin layer 28 before the second measurement test and of the surface (inner peripheral surface) of the resin layer 28 after 16 hours (after the test) from the start of sliding in the metal bush 32 of Comparative Example 3.

In FIGS. 13 and 14, a broken line shows unevenness in a radial direction of the metal bush 32 on the surface (inner peripheral surface) of the resin layer 28 before the test, and the solid line shows the unevenness after the test by measuring with a probe. "OUT" means a radially outer side of the metal bush 32 from a reference position A of the profile before the test and "IN" means a radially inner side of the metal bush 32 from the reference position A of the profile before the test.

(Fourth Measurement Test of Frictional Force)

In the fourth measurement test, the frictional force was measured in the same manner as in the second measurement test except that the magneto-rheological fluid composition containing a large amount of magnetic particles was used as the test oil 41 for the metal bush 32 of Example 1. This magneto-rheological fluid composition is obtained by removing the liquid component from MRF-126CD manufactured by LORD Corporation, to adjust the content of the magnetic particles to 90 mass %.

Figure 15:
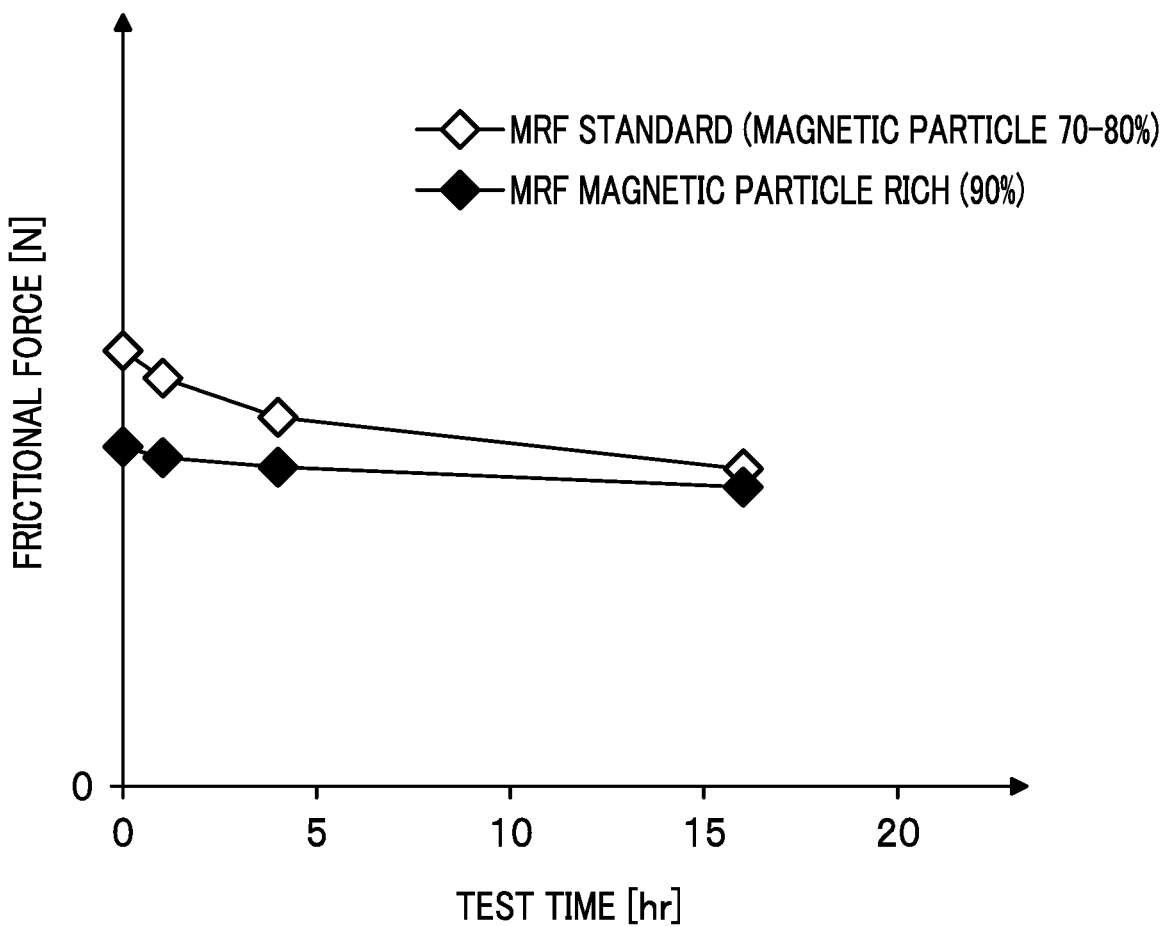
FIG. 15 is a graph showing measurement results of a fourth measurement test of frictional force performed in the examples.

FIG. 15 is a graph showing measurement results of the fourth measurement test of the frictional force. The measurement results are shown as "MRF MAGNETIC PARTICLE RICH (90%)" in FIG. 15. The measurement results of the metal bush 32 of Example 1 in the second measurement test are also shown as "MRF STANDARD (MAGNETIC PARTICLE 70-80%)" in FIG. 15.

Figure 16A:
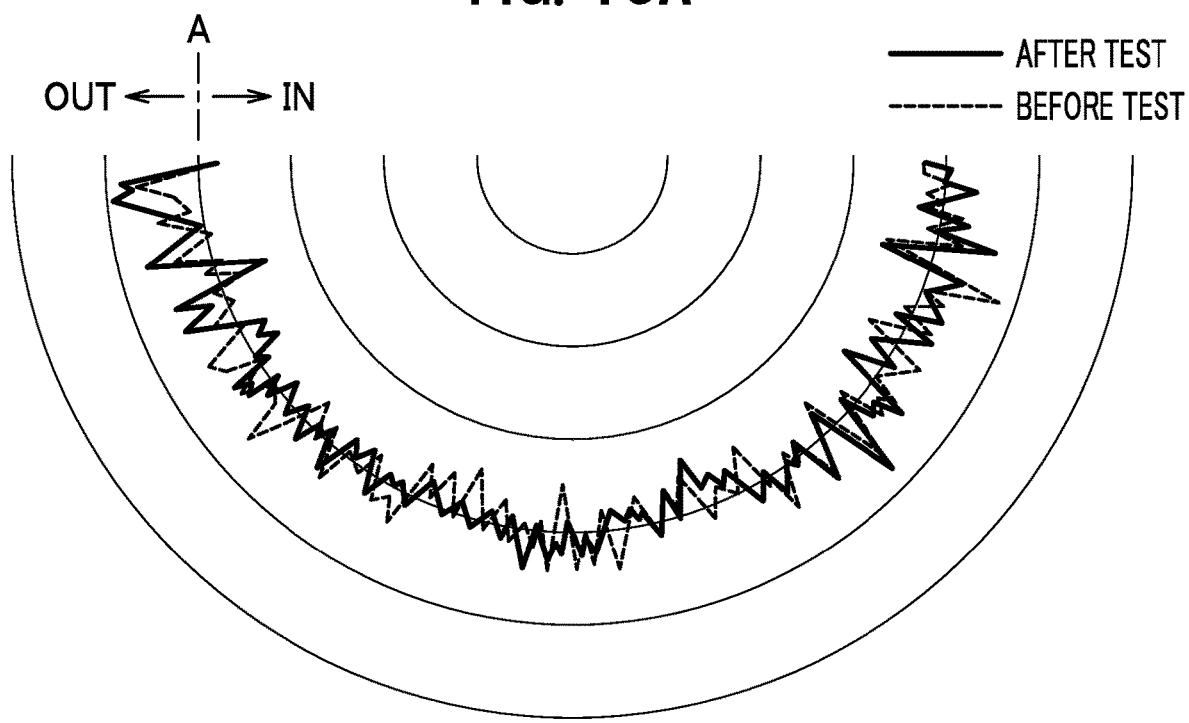
FIG. 16A is a graph showing profiles of a surface (an inner peripheral surface) of a resin layer before the second measurement test and of the surface (inner peripheral surface) of the resin layer after 16 hours (after the test) from the start of sliding in the bearing member (metal bush) of Example 1 with an MRF composition containing a standard amount of magnetic particles (70-80%)
Figure 16B:
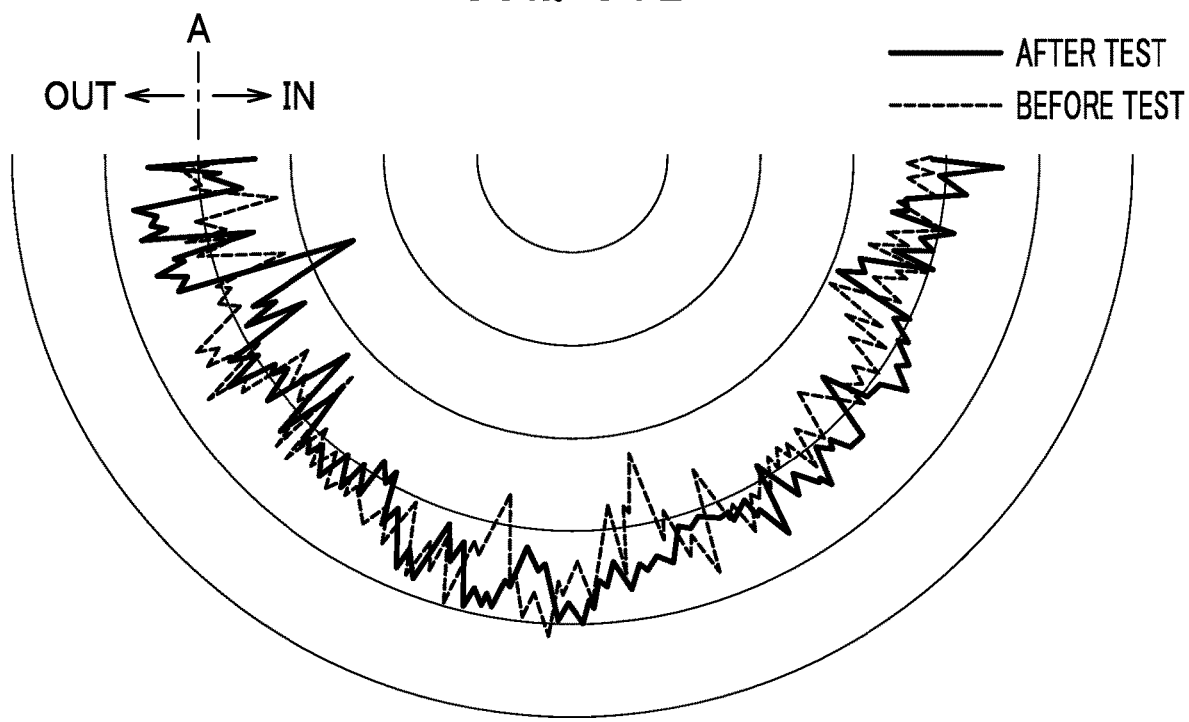
FIG. 16B is a graph showing profiles of a surface (an inner peripheral surface) of a resin layer before the fourth measurement test and of the surface (inner peripheral surface) of the resin layer after 16 hours (after the test) from the start of sliding in the bearing member (metal bush) of Example 1 with an MRF composition containing a large amount of magnetic particles (90%).

FIG. 16A is a graph showing profiles of a surface (an inner peripheral surface) of the resin layer 28 before the second measurement test and of the surface (inner peripheral surface) of the resin layer 28 after 16 hours (after the test) from the start of sliding in the metal bush 32 of Example 1. FIG. 16B is a graph showing profiles of a surface (an inner peripheral surface) of the resin layer 28 before the fourth measurement test and of the surface (inner peripheral surface) of the resin layer 28 after 16 hours (after the test) from the start of sliding in the metal bush 32 of Example 1.

(Evaluation Results of Frictional Force)

As shown in FIG. 8, in the first measurement test of the frictional force when the test oil 41 containing no magnetic particles was used, the frictional force of the metal bush 32 of Example 1, Example 2, and Comparative Example 3 was smaller than that of the metal bush 32 of Comparative Example 1 and Comparative Example 2. Incidentally, in the first measurement test using the test oil 41 containing no magnetic particles, no remarkable damage was found in any of the resin layers 28 of the metal bushes 32 of Example 1, Example 2, and Comparative Examples 1 to 3.

Thus, it is considered that the metal bush 32 (bearing member) of the present invention has more chemical affinity with the magneto-rheological fluid composition as compared with the metal bush 32 of Comparative Examples, and oil retention property under boundary lubrication environment for the liquid component of the magneto-rheological fluid composition containing no magnetic particles is improved so that low friction property can be obtained.

As shown in FIG. 9, in the second measurement test of the frictional force when using the magneto-rheological fluid composition, the metal bush 32 of Examples 1 and 2 maintained low frictional force even after 16 hours from the start of sliding. In contrast, the metal bush 32 of Comparative Example 2 showed high frictional force until 16 hours after the start of sliding. Further, the frictional force of the metal bush 32 of Comparative Example 1 increased after 4 hours. Note that the frictional force of the metal bush 32 of Comparative Example 3 remarkably increased at 4 hours from the start of sliding. This is probably because the resin layer 28 has worn remarkably as will be described later.

As shown in FIG. 10, in the third measurement test of the frictional force when using the magneto-rheological fluid composition, a rate of increase of the frictional force with respect to the load F was large in the metal bush 32 of Comparative Examples 1 and 2. That is, the metal bush 32 of Comparative Examples 1 and 2 showed a large rate of increase of the frictional force with respect to the lateral force load. In contrast, the metal bush 32 of Examples 1, 2 and Comparative Example 3 showed a small rate of increase of the frictional force with respect to the load F compared with the metal bush 32 of Comparative Examples 1 and 2. That is, it was verified that the metal bush 32 of Examples 1, 2, and Comparative Example 3 has less dependency of the frictional force on the lateral force load.

As shown in FIGS. 11A and 11B, in the metal bush 32 of Example 1 after 16 hours from the start of sliding, the magnetic particles 41a present in a vicinity of an interface between the resin layer 28 and the test oil 41 (magneto-rheological fluid composition) was slight. Further, most of the slightly existing magnetic particles 41a were buried in the resin layer 28. In contrast, as shown in FIGS. 12A and 12B, in the metal bush 32 of Comparative Example 3 after 16 hours from the start of sliding, a large number of magnetic particles 41a were observed in the vicinity of the interface between the resin layer 28 and the test oil 41 (magneto-rheological fluid composition). Further, many magnetic particles 41a existed over the surface of the resin layer 28 and the test oil 41 (magneto-rheological fluid composition).

As shown in FIG. 13, it was confirmed that the surface of the resin layer 28 was hardly worn even after the second measurement test in the metal bush 32 of Example 1. In contrast, as shown in FIG. 14, it was confirmed that the surface of the resin layer 28 has worn remarkably in the metal bush 32 of Comparative Example 3.

Thus, it is understood that the metal bush 32 (bearing member) of the present invention has higher embeddability of the magnetic particles in the resin layer than the metal bush 32 of Comparative Examples, and it is possible to apparently remove the magnetic particles from the surface of the frictional sliding portion, thereby obtaining low friction and low wear characteristics.

As shown in FIG. 15, in the metal bush 32 of Example 1, even when the magneto-rheological fluid composition containing a large amount of magnetic particles is used as the test oil 41, it is confirmed that the frictional force is kept low similarly to a general magneto-rheological fluid composition containing magnetic particles at an ordinal content ratio. Further, as is apparent from a comparison between FIGS. 16A and 16B, even when the magneto-rheological fluid composition containing a large amount of magnetic particles is used as the test oil 41 (FIG. 16B), it is confirmed that an amount of wear is kept low similarly to the general magneto-rheological fluid composition containing magnetic particles at an ordinal content ratio (FIG. 16A). The above results are shown in Table 1 as friction characteristics and wear resistance of the metal bush 32.

REFERENCE SIGNS LIST

10: vibration damping device
12: cylinder
12a: eyepiece
13: piston rod

14: first liquid chamber
15: second liquid chamber
16: piston
17: high pressure gas chamber
18: free piston
19: rod guide
21: communication hole
22: electromagnetic coil
23: power supply line
25: base member
26: oil seal
27: porous metal layer
28: resin layer
31: base material portion
32: metal bush (bearing member)
33: metal bush holder
35: small diameter portion
36: large diameter portion
37: oil seal arrangement portion
41: test oil (magneto-rheological fluid composition)
41a: magnetic particle

The invention claimed is:

1. A vibration damping device serving as a variable damping force damper, the vibration damping device comprising:
 a cylinder;
 a piston rod inserted into the cylinder;
 a piston connected to the piston rod and disposed axially slidably in the cylinder;
 a first liquid chamber and a second liquid chamber partitioned in the cylinder by the piston and filled with a magneto-rheological fluid composition;
 a communication hole formed in the piston so as to communicate the first liquid chamber and the second liquid chamber; and
 an electromagnetic coil for applying a magnetic field to the magneto-rheological fluid composition flowing through the communication hole, wherein
 the piston rod is slidably supported by a bearing member disposed in the cylinder,
 the bearing member comprises a resin layer on a side defined as a friction sliding surface of a base member,
 the resin layer comprises polytetrafluoroethylene and a tetrafluoroethylene-perfluoroalkyl vinyl ether copolymer resin,
 the resin layer further comprises a solid lubricant and/or an inorganic filler,
 the base member is made of a steel material,
 the resin layer is impregnated and coated on a porous metal layer formed on the base member, and
 the bearing member is lubricated by the magneto-rheological fluid composition.

2. The vibration damping device according to claim 1, further comprising a rod guide which seals one end of the first liquid chamber, and the bearing member is disposed with the rod guide.

3. The vibration damping device according to claim 2, wherein the rod guide includes a base portion made of metal, and the bearing member is disposed between the base portion of the rod guide and the piston rod.

* * * * *